Nov. 13, 1934.     C. L. POST     1,980,823
COUPLING
Filed Jan. 18, 1933
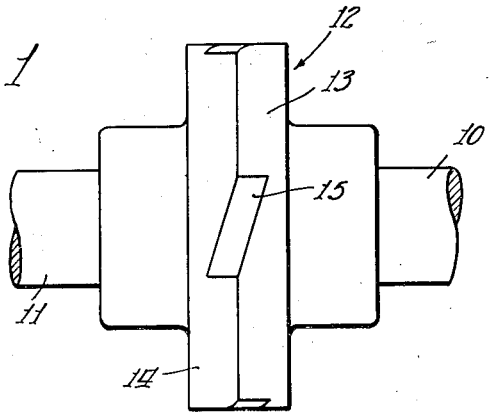
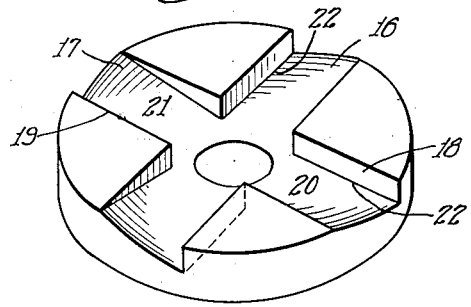
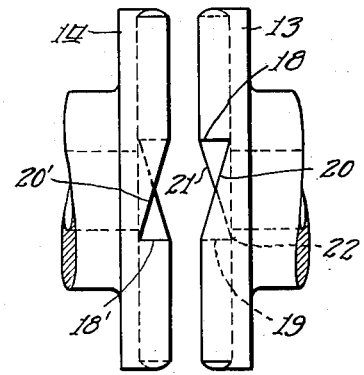
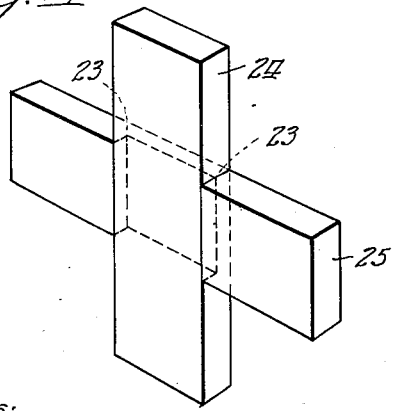
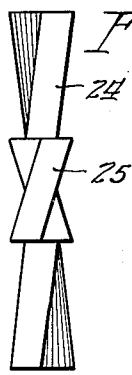
Witness:
V. Siljander
Inventor
Claude L. Post
By:
Hill & Hill  Attys.

Patented Nov. 13, 1934

1,980,823

UNITED STATES PATENT OFFICE 1,980,823

COUPLING

Claude L. Post, Chicago, Ill.

Application January 18, 1933, Serial No. 652,336

8 Claims. (Cl. 64—96)

The invention relates to improvements in shaft couplings and has among its principal objects the provision of a simple structure whereby the motion of a drive shaft may be successfully transmitted to the driven shaft and which will allow this advantage to be accomplished even though said shafts are not in absolute axial alignment with each other.

The invention has as another object the provision of a structure whereby the means employed for keying the coupling elements together is acted upon so that same is forced into driving relation with the driven member of the coupling.

The invention also has as an object the provision of a pair of elements, each of which has a groove provided in a face thereof, the groove being preferably arranged transversely to the axis of the respective elements, the groove having a wall formed to extend from the base of the groove to the plane of the face and has portions which are inclined relatively to each other, the grooves being provided for the reception of a keying or coupling member which is arranged in the groove and employed to transmit motion from the driving element to the driven element.

The invention has also as an object the employment of a flexible key which will thus reduce noise resultant from operation of the coupling.

The invention has these and other objects all of which will be explained in detail and more readily understood when read in conjunction with the accompanying drawing which illustrates one embodiment of the invention, it being evident that changes and modifications may be resorted to without departing from the spirit of the appended claims forming a part hereof.

In the drawing, Fig. 1 is a side elevation of a coupling embodying the invention;

Fig. 2 is a perspective view of one of the elements shown in Fig. 1;

Fig. 3 is a side elevation of the elements shown in Fig. 1 illustrating said elements in separated relation;

Fig. 4 is a perspective view of a keying member employed in the structure; and

Fig. 5 is a view illustrating the condition of the keying member when applied for use.

In the drawing, the numeral 10 designates a drive shaft and the numeral 11 a driven shaft which are connected with each other through the coupling generally designated 12. This coupling is comprised of the elements or plates 13 and 14 having combined therewith a keying member generally designated 15, the latter providing an element of means for transmitting the rotative motion of the drive shaft 10 to the driven shaft 11.

Each of the coupling elements 13 and 14 is provided with transversely arranged grooves generally designated 16 and 17 and since the grooves of one of the elements 13 and 14 are identical with the grooves of the other, an explanation of the form of the grooves provided in one of these elements will suffice for an understanding of all.

By referring to Figs. 1 and 3, it will be noted that these grooves have the opposite ends thereof formed to provide the oppositely facing shoulders or walls 18 and 19 and are also formed at their opposite ends to produce base portions 20 and 21 which incline respectively from the plane of the face of the coupling element to the bottom 22 of the walls 18 and 19. It will be further noted that the base portion 20 of one end of one groove on one side of the center line of the coupling is inclined to a similar base portion 21 of the opposite end of said groove and at the opposite side of said center line, in other words, these base portions incline in opposite directions relatively to each other. As before stated, a coupling element or key member such as 15 is employed in the structure. This key is preferably of some flexible material such as leather or rubber composition and is formed as illustrated in Fig. 4. This keying member is formed in the present instance of two pieces of material designated 24 and 25, which are recessed to provide a lap joint as indicated at 23 to reduce the thickness of the composite element at the juncture of the material providing the key.

When this key 15 is arranged in the grooves provided in the face of the coupling elements, one end of each of the pieces 24 and 25 will be disposed at an angle to the opposite end as illustrated in Fig. 5 and thus will conform to the shape or outline of the keyways or channels produced by the grooves provided in the adjacent faces of the coupling elements 13 and 14 when these faces are brought together and will thus transmit motion from the coupling element 13 to the coupling element 14, this motion being transmitted from the shoulder 18 in the coupling element 13 to the shoulder 18' of the element 14. By virtue of the inclined base portions 20 and 21 on the respective coupling elements 13 and 14, the material of the key member will be distorted from its normal flat condition shown in Fig. 4 to that shown in Fig. 5 and forced into the grooves 16 and 17 of the respective coupling elements, thereby providing a connection between the elements to permit driving of either one of the elements by the other.

From the foregoing description, it will be evident that a structure is provided which will permit two shafts to be coupled with each other even though the shafts are not in absolute axial alignment with each other, and which also produces a structure which will successfully transmit the rotative motion of one of the shafts to the other, and in which the keying element is forced into effective driving connection with the coupling elements, thereby insuring transmission of motion from the drive shaft to the driven shaft.

Having thus described the invention, what I claim as new and desire to cover by Letters Patent is:

1. A coupling comprised of a pair of elements, each of said elements having a groove provided in a face thereof arranged transverse to the axis of the respective elements, said groove having base portions on opposite sides of the center line of the coupling which extend from the bottom of one wall thereof to the plane of said face and are inclined in opposite directions relatively to each other and a coupling member arranged in said grooves providing means for transmitting motion from one of said first mentioned elements to the other.

2. A coupling comprised of a pair of elements, each of said elements having grooves arranged transverse to each other in a face of said elements, said grooves having base portions at opposite sides of the center line of the coupling which extend from the bottom of one wall of said groove to the plane of said face, said portions being inclined in opposite directions relatively to each other and a coupling member arranged in said grooves, said coupling member providing means for transmitting motion from one of said first mentioned elements to the other.

3. A coupling element, said element having a groove provided in a face of said element providing means for receiving a coupling member, said groove being arranged transverse of the axis of said coupling element and having base portions at the opposite sides of the center line of the coupling element which are inclined in opposite directions relatively to each other and inclined relatively to the plane of the face of said element.

4. A coupling element, said element having grooves provided in a face of said element providing means for the reception of a coupling member, said grooves being disposed at an angle to each other and having base portions at their opposite ends which are inclined in opposite directions relatively to each other and relatively to the plane of the face of said element.

5. A coupling element having a groove provided in a face of said element providing means for receiving a coupling member, said groove being arranged transverse to the axis of said element and having base portions adjacent its ends which are inclined relatively to the plane of said face and being inclined in opposite directions relatively to each other and providing oppositely facing shoulders for cooperation with said coupling member.

6. A coupling element having a groove provided in a face of said element providing means for receiving a coupling member, said groove being arranged transverse of the axis of said element and providing oppositely facing shoulders which extend inwardly of a face of said element, the base of said groove having portions at the opposite sides of the center line of the coupling element which are inclined relatively to the plane of the face of said element and which are inclined in opposite directions relatively to each other and inclined from said face of said element to one termination of said shoulder.

7. A coupling device of the kind described comprising a plurality of members, each of said members provided with intersecting grooves designed to form a seat for the reception of a key when said members are arranged substantially opposite each other, and a key of flexible material having a plurality of interlocking parts arranged in said seat to provide an operable connection between said members.

8. A coupling device of the character described comprising a pair of like coupling plates having transversely extending grooves formed in their adjacent faces, the base of each of said grooves having oppositely inclined end portions, and a flexible key member positioned in the grooves of the respective plates for providing a driving connection between said plates.

CLAUDE L. POST.